US012191637B1

(12) United States Patent
Koenig

(10) Patent No.: US 12,191,637 B1
(45) Date of Patent: Jan. 7, 2025

(54) SPARK PLUG WITH COOLING FEATURES AND METHOD OF MANUFACTURING THE SAME

(71) Applicant: FEDERAL-MOGUL IGNITION GMBH, Neuhaus-Schierschnitz (DE)

(72) Inventor: Daniel Koenig, Rodental (DE)

(73) Assignee: FEDERAL-MOGUL IGNITION GMBH, Neuhaus-Schierschnitz (DE)

( * ) Notice: Subject to any disclaimer, the term of this patent is extended or adjusted under 35 U.S.C. 154(b) by 0 days.

(21) Appl. No.: 18/743,823

(22) Filed: Jun. 14, 2024

(51) Int. Cl.
*H01T 13/16* (2006.01)
*H01T 13/32* (2006.01)
*H01T 13/39* (2006.01)
*H01T 21/02* (2006.01)

(52) U.S. Cl.
CPC ............. *H01T 13/16* (2013.01); *H01T 13/32* (2013.01); *H01T 13/39* (2013.01); *H01T 21/02* (2013.01)

(58) Field of Classification Search
CPC ................................ H01T 13/32; H01T 13/16
USPC ......................................................... 313/11.5
See application file for complete search history.

(56) References Cited

U.S. PATENT DOCUMENTS 2,169,421 A 8/1939 Kasarjian
3,119,944 A 1/1964 Lentz et al.
4,786,267 A 11/1988 Toya et al.
5,273,474 A 12/1993 Oshima et al.
5,347,193 A 9/1994 Oshima et al.
5,461,276 A 10/1995 Matsutani et al.
5,510,667 A 4/1996 Loeffler et al.
5,866,973 A 2/1999 Kagawa et al.
5,977,695 A 11/1999 Osamura et al.
6,621,198 B2 9/2003 Kanao et al.
7,385,339 B2 6/2008 Lineton et al.
7,385,355 B2 6/2008 Kusunoki et al.
7,521,850 B2 4/2009 Lykowski
(Continued)

FOREIGN PATENT DOCUMENTS

CN 103094842 A 5/2013
CN 103457160 A 12/2013
(Continued)

OTHER PUBLICATIONS

US 10,576,577, 06/2007, Le Breis (withdrawn)
(Continued)

*Primary Examiner* — Christopher M Raabe
(74) *Attorney, Agent, or Firm* — REISING ETHINGTON P.C.

(57) ABSTRACT

A spark plug having one or more cooling feature(s) that reduce the temperature of a ground electrode and can be manufactured using an additive manufacturing process. The cooling feature(s) include internal cooling passages that can be filled with either a heat conducting solid (passive cooling example) or a heat conducting fluid (active cooling example). In the passive cooling example, the internal cooling passage is filled with a heat conducting solid that is inserted into the passage, melted and solidified such that it forms a metallic bond with the walls of the passage. In the active cooling example, the internal cooling passage is filled with a heat conducting fluid that flows through the passage and removes heat from the ground electrode. In both examples, internal cooling passage(s) of the ground electrode are aligned with corresponding cooling passage(s) formed in the shell.

20 Claims, 3 Drawing Sheets

(56) References Cited

U.S. PATENT DOCUMENTS

| | | | | |
|---|---|---|---|---|
| 7,569,979 | B2 | 8/2009 | Lykowsi et al. | |
| 7,666,047 | B2 | 2/2010 | Suzuki et al. | |
| 7,740,683 | B2 | 6/2010 | Thorsson et al. | |
| 7,795,790 | B2 | 9/2010 | Lineton | |
| 7,808,165 | B2 | 10/2010 | Kowalski | |
| 7,891,095 | B2 | 2/2011 | Jonsson et al. | |
| 8,348,709 | B1 | 1/2013 | Passman et al. | |
| 8,354,782 | B2 | 1/2013 | Sakayanagi et al. | |
| 8,427,038 | B2 | 4/2013 | Taido et al. | |
| 8,841,828 | B2 | 9/2014 | Igarashi et al. | |
| 8,896,193 | B2 | 11/2014 | Kataoka | |
| 8,926,879 | B2 | 1/2015 | Vagt et al. | |
| 8,987,981 | B2 | 3/2015 | Imai | |
| 9,077,158 | B2 | 7/2015 | Murayama et al. | |
| 9,130,358 | B2 | 9/2015 | Ma | |
| 9,219,351 | B2 | 12/2015 | Walker, Jr. | |
| 9,636,869 | B2 | 5/2017 | Kroll et al. | |
| 9,662,840 | B1 | 5/2017 | Buller et al. | |
| 9,698,576 | B2 | 7/2017 | Niessner et al. | |
| 9,713,843 | B2 | 7/2017 | Snyder et al. | |
| 9,739,192 | B2 | 8/2017 | Willi | |
| 9,800,023 | B2 | 10/2017 | Niessner et al. | |
| 9,806,500 | B2 | 10/2017 | Sakairi et al. | |
| 9,843,045 | B2 | 12/2017 | Yuge et al. | |
| 9,853,423 | B1 | 12/2017 | Sumoyama et al. | |
| 9,871,351 | B2 | 1/2018 | Thomas et al. | |
| 9,893,361 | B1 | 2/2018 | Jaker et al. | |
| 9,948,069 | B2 | 4/2018 | Segawa et al. | |
| 9,991,680 | B2 | 6/2018 | Ikeda et al. | |
| 10,008,832 | B2 | 6/2018 | Quest et al. | |
| 10,259,163 | B2 | 4/2019 | Eilken et al. | |
| 10,328,526 | B2 | 6/2019 | Ols et al. | |
| 10,415,122 | B2 | 9/2019 | Barthelemy et al. | |
| 10,472,698 | B2 | 11/2019 | Zeniya et al. | |
| 10,539,255 | B2 | 1/2020 | Kroll et al. | |
| 10,559,944 | B2 | 2/2020 | Kaji et al. | |
| 10,744,590 | B2 | 8/2020 | Maier et al. | |
| 10,826,279 | B1 * | 11/2020 | Santana | H01T 13/39 |
| 10,897,123 | B2 | 1/2021 | Abe et al. | |
| 10,913,257 | B2 | 2/2021 | Coupland et al. | |
| 11,189,993 | B2 | 11/2021 | Grabner et al. | |
| 2001/0013746 | A1 | 8/2001 | Kanao et al. | |
| 2001/0025617 | A1 | 10/2001 | Kanao | |
| 2002/0011768 | A1 * | 1/2002 | Boehler | H01T 21/02 313/141 |
| 2004/0100178 | A1 | 5/2004 | Kanao et al. | |
| 2004/0129683 | A1 | 7/2004 | Torii et al. | |
| 2004/0140745 | A1 | 7/2004 | Hrastnik | |
| 2005/0218771 | A1 | 10/2005 | Hrastnik | |
| 2006/0028106 | A1 | 2/2006 | Lineton et al. | |
| 2007/0013126 | A1 | 6/2007 | Didier | |
| 2007/0132354 | A1 | 6/2007 | Scott et al. | |
| 2007/0236123 | A1 | 10/2007 | Lykowski et al. | |
| 2009/0277540 | A1 | 11/2009 | Langlet | |
| 2012/0194056 | A1 | 8/2012 | Ma | |
| 2013/0069516 | A1 | 3/2013 | Sumoyama et al. | |
| 2013/0313960 | A1 | 11/2013 | Francesconi | |
| 2014/0152170 | A1 | 1/2014 | Kasuya et al. | |
| 2014/0049151 | A1 | 2/2014 | Murayama et al. | |
| 2014/0170598 | A1 | 6/2014 | Abend et al. | |
| 2015/0145169 | A1 | 5/2015 | Liu et al. | |
| 2015/0223869 | A1 | 8/2015 | Mayer et al. | |
| 2016/0003150 | A1 | 1/2016 | Dicintio et al. | |
| 2016/0082511 | A1 | 3/2016 | Cui et al. | |
| 2016/0087411 | A1 * | 3/2016 | Sakakura | H01T 13/32 313/141 |
| 2016/0218489 | A1 | 7/2016 | Dicintio et al. | |
| 2016/0243650 | A1 | 8/2016 | Lin et al. | |
| 2016/0263832 | A1 | 9/2016 | Bui et al. | |
| 2016/0271696 | A1 | 9/2016 | Kamakura | |
| 2016/0298213 | A1 | 10/2016 | Yang et al. | |
| 2016/0312338 | A1 | 10/2016 | Miller | |
| 2017/0040917 | A1 | 2/2017 | Chang et al. | |
| 2017/0062798 | A1 | 3/2017 | Wang et al. | |
| 2017/0107946 | A1 | 4/2017 | Le Cras et al. | |
| 2017/0167357 | A1 | 6/2017 | Maier | |
| 2017/0167358 | A1 | 6/2017 | Maier et al. | |
| 2017/0179472 | A1 | 6/2017 | Allie et al. | |
| 2017/0251546 | A1 | 8/2017 | Ikeda et al. | |
| 2017/0253536 | A1 | 9/2017 | Danforth et al. | |
| 2017/0264083 | A1 | 9/2017 | Niessner et al. | |
| 2017/0304894 | A1 | 10/2017 | Buller | |
| 2017/0331260 | A1 | 11/2017 | Quest et al. | |
| 2017/0350590 | A1 | 12/2017 | Choudhri et al. | |
| 2018/0056604 | A1 | 3/2018 | Sands et al. | |
| 2018/0366918 | A1 | 12/2018 | Sumoyama et al. | |
| 2018/0369919 | A1 | 12/2018 | Burkhardt | |
| 2019/0001415 | A1 | 1/2019 | Morimoto et al. | |
| 2019/0009335 | A1 | 1/2019 | Kloft et al. | |
| 2019/0366585 | A1 | 12/2019 | Nagai et al. | |
| 2019/0375049 | A1 | 12/2019 | Werner | |
| 2020/0021084 | A1 | 1/2020 | Kimura | |
| 2020/0207069 | A1 | 7/2020 | Coupland et al. | |
| 2020/0251872 | A1 | 8/2020 | Drachenberg et al. | |
| 2020/0256308 | A1 | 8/2020 | Assaad | |
| 2020/0269352 | A1 | 8/2020 | Maurer et al. | |
| 2020/0399744 | A1 | 12/2020 | Smith et al. | |
| 2021/0053119 | A1 | 2/2021 | Geisen | |
| 2021/0086279 | A1 | 3/2021 | Clover et al. | |
| 2021/0273417 | A1 | 9/2021 | Ritter et al. | |
| 2022/0016800 | A1 | 1/2022 | Lescoche et al. | |
| 2022/0032499 | A1 | 2/2022 | Lescoche et al. | |
| 2022/0045485 | A1 | 2/2022 | Resnick | |
| 2022/0059999 | A1 | 2/2022 | Ritsema et al. | |
| 2022/0140576 | A1 | 5/2022 | Niessner et al. | |
| 2022/0149598 | A1 | 5/2022 | Trebbels | |
| 2022/0200246 | A1 * | 6/2022 | Francis | H01T 13/20 |
| 2022/0285920 | A1 * | 9/2022 | Niessner | H01T 21/02 |
| 2024/0047948 | A1 * | 2/2024 | Konig | H01T 13/32 |

FOREIGN PATENT DOCUMENTS

| | | | |
|---|---|---|---|
| CN | 203387050 | U | 1/2014 |
| CN | 104923797 | A | 9/2015 |
| CN | 206065410 | U | 4/2017 |
| CN | 106735273 | A | 5/2017 |
| CN | 106881509 | A | 6/2017 |
| CN | 107891200 | A | 4/2018 |
| CN | 107974682 | A | 5/2018 |
| CN | 208299203 | U | 12/2018 |
| CN | 109332694 | A | 2/2019 |
| CN | 110125399 | A | 8/2019 |
| CN | 110899695 | A | 3/2020 |
| CN | 110539386 | B | 2/2021 |
| CZ | 2013291 | A3 | 3/2014 |
| CZ | 2013212 | A3 | 10/2014 |
| CZ | 306282 | B6 | 11/2016 |
| DE | 102012223239 | A1 | 6/2014 |
| DE | 102016209094 | A1 | 11/2017 |
| DE | 112011102588 | B4 | 2/2018 |
| DE | 102016216963 | A1 | 3/2018 |
| DE | 102017221136 | A1 | 5/2019 |
| DE | 102017221137 | A1 | 5/2019 |
| DE | 102018200349 | A1 | 7/2019 |
| DE | 102018212894 | A1 | 2/2020 |
| DE | 102019218408 | A1 | 2/2021 |
| EP | 1594200 | B1 | 11/2007 |
| EP | 1596482 | B1 | 6/2011 |
| EP | 2727898 | A1 | 5/2014 |
| EP | 3035458 | A1 | 6/2016 |
| EP | 3263524 | A1 | 1/2018 |
| FR | 3095149 | A1 | 10/2020 |
| GB | 556330 | A | 9/1943 |
| GB | 2544465 | A | 5/2017 |
| JP | S6355880 | A | 3/1988 |
| JP | H0513145 | A | 1/1993 |
| JP | H0513147 | A | 1/1993 |
| JP | H0554953 | A | 3/1993 |
| JP | H0567488 | A | 3/1993 |
| JP | H0582235 | A | 4/1993 |
| JP | H05159855 | A | 6/1993 |
| JP | H05182742 | A | 7/1993 |
| JP | H05242952 | A | 9/1993 |
| JP | 1022054 | A | 1/1998 |

(56) References Cited

FOREIGN PATENT DOCUMENTS

| | | | |
|---|---|---|---|
| JP | 10106715 | A | 4/1998 |
| JP | H10106716 | A | 4/1998 |
| JP | 3043475 | B2 | 5/2000 |
| JP | 3128270 | B2 | 1/2001 |
| JP | 3192450 | B2 | 7/2001 |
| JP | 3359347 | B2 | 12/2002 |
| JP | 2002359053 | A | 12/2002 |
| JP | 2005150011 | A | 6/2005 |
| JP | 2006185928 | A | 7/2006 |
| JP | 4295064 | B2 | 7/2009 |
| JP | 2009270130 | A | 11/2009 |
| JP | 2013037807 | A | 2/2013 |
| JP | 2014072037 | A | 4/2014 |
| JP | 6288287 | B2 | 3/2018 |
| JP | 6344966 | B2 | 6/2018 |
| JP | 6598081 | B2 | 10/2019 |
| JP | 2021026873 | A | 2/2021 |
| JP | 2022021825 | A | 2/2022 |
| KR | 100400101 | B1 | 9/2003 |
| WO | 9807220 | A1 | 2/1998 |
| WO | 2005025783 | A1 | 3/2005 |
| WO | 2006017687 | A2 | 2/2006 |
| WO | 2013128416 | A2 | 9/2013 |
| WO | 2015173790 | A1 | 11/2015 |
| WO | 2016116385 | A1 | 7/2016 |
| WO | 2016156973 | A1 | 10/2016 |
| WO | 2017143961 | A1 | 8/2017 |
| WO | 2017221010 | A1 | 12/2017 |
| WO | 2019025795 | A1 | 2/2019 |
| WO | WO2019025796 | A1 | 2/2019 |
| WO | WO2020109715 | A1 | 6/2020 |
| WO | WO2020109716 | A1 | 6/2020 |
| WO | 2021253061 | A1 | 12/2021 |
| WO | 2022040544 | A1 | 2/2022 |

OTHER PUBLICATIONS

Pavel Krakhmalev et a.; Microstructure, Solidification Texture, and Thermal Stability of 316 L Stainless Steel Manufactured by Laser Powder Bed Fusion; MDPI Journal; Aug. 15, 2018.

Terrence E. Johnson et al.; Three-dimensional Projection-based Topology Optimization for Prescribed-angle Self-Supporting Additively Manufactured Structures.

* cited by examiner

SPARK PLUG WITH COOLING FEATURES AND METHOD OF MANUFACTURING THE SAME

FIELD

The present invention generally relates to spark plugs and other ignition devices and, in particular, to spark plug components having cooling features.

BACKGROUND

Spark plugs are used to initiate combustion in internal combustion engines. Typically, spark plugs ignite an air/fuel mixture in a combustion chamber so that a spark is produced across a spark gap between two or more electrodes. The ignition of the air/fuel mixture by means of the spark triggers a combustion reaction in the combustion chamber, which is responsible for the power stroke of the engine. The high temperatures, pressures and electrical voltages, the rapid repetition of combustion reactions, and the presence of corrosive materials in the combustion gases can create a harsh environment in which the spark plug must function. The harsh environment can contribute to an erosion and/or corrosion of the electrodes, which can negatively affect the performance of the spark plug over time.

In order to meet increasingly stringent emission requirements, internal combustion engines are being designed to carry out the combustion process at higher and higher temperatures. The elevated temperature environment within the engine can further exacerbate erosion of the electrodes and increase the likelihood of pre-ignition due to excessively hot electrode surfaces, particularly at the ground electrode. In addition, the elevated temperatures within the engine exert significant thermal loads on various spark plug components, including precious metal firing tips that are welded to center and/or ground electrodes. These thermal loads create stress on the welds or joints due to differences in coefficients of thermal expansion, melting temperatures and/or other material properties. Thus, there has been a trend in the industry to develop spark plugs with various types of cooling features, such as thermally conductive cores that extend within electrodes and convey heat away from the spark gap. Traditional manufacturing techniques for forming electrodes with thermally conductive cores generally involve inserting a slug of thermally conductive material into a pocket of electrode material and then co-drawing the materials together into an elongated electrode.

Another trend in the industry involves the use of additive manufacturing techniques like 3D printing to create various types of spark plug components, including electrodes. However, due to limitations with the manufacturing process and the materials involved, it has been difficult to effectively produce additive manufactured spark plug electrodes with cooling features, such as thermally conductive cores, built inside.

The spark plug described herein is designed to address one or more of the drawbacks and challenges mentioned above.

SUMMARY

According to one embodiment, there is provided a spark plug, comprising: a shell having an axial bore; an insulator at least partially disposed within the axial bore of the shell and having an axial bore; a center electrode at least partially disposed within the axial bore of the insulator; a ground electrode attached to the shell and having an electrode base; and a cooling feature having a first internal cooling passage formed within the electrode base of the ground electrode, a first heat conducting material situated within the first internal cooling passage, a second internal cooling passage formed within the shell, and a second heat conducting material situated within the second internal cooling passage, wherein the first internal cooling passage is aligned with the second internal cooling passage and the first heat conducting material is thermally coupled to the second heat conducting material so that, during operation, the cooling feature can remove heat from an area near a sparking surface.

In accordance with the various embodiments, the spark plug may have any one or more of the following features, either singly or in any technically feasible combination:

- the electrode base of the ground electrode includes a plurality of laser deposition layers that are arranged one on top of another and define the first internal cooling passage;
- the plurality of laser deposition layers of the electrode base are made from a nickel-based material using a powder bed fusion technique;
- the ground electrode includes an electrode tip made from a precious metal-based material, the electrode tip includes the sparking surface and is attached to the electrode base such that the first heat conducting material is directly thermally coupled to the electrode tip at a heat input portion;
- the cooling feature is a passive cooling feature, the first heat conducting material is a solid material that is bonded to the first internal cooling passage with a first metallic bond, and the second heat conducting material is a solid material that is bonded to the second internal cooling passage with a second metallic bond;
- each of the first and second heat conducting materials is made from at least one of a copper-based material, a silver-based material or a tin-based material;
- the first and second heat conducting materials are the same material;
- the first and second heat conducting materials are different materials;
- the cooling feature is an active cooling feature, and the first and second heat conducting materials are a fluid material that flows within the first and second internal cooling passages;
- the first and second heat conducting materials are the same material and include at least one of water, glycol, liquid sodium or a mixture thereof;
- the first internal cooling passage includes a heat output portion with a flared or enlarged opening for improved alignment with the second internal cooling passage;
- the ground electrode is a bridge-type ground electrode that extends across the entire axial bore of the shell and attaches to the shell at first and second locations, the first internal cooling passage includes a heat input portion, first and second heat output portions, and a main passage portion, the first heat output portion branches off of the main passage portion at a first end of the main passage portion and extends to an area near a first attachment surface where the ground electrode attaches to the shell, the second heat output portion branches off of the main passage portion at a second end of the main passage portion and extends to an area near a second attachment surface where the ground electrode attaches to the shell; and the heat input portion branches off of the main passage portion at a middle section of the main passage portion that is located between the first and second ends; and the ground electrode is an arc-type ground electrode that extends across part of the axial bore of the shell and attaches to the shell at a first location.

According to another embodiment, there is provided a ground electrode for a spark plug, comprising: an electrode base having a plurality of laser deposition layers arranged one on top of another; and a cooling feature having an internal cooling passage and a heat conducting material, the internal cooling passage is filled with the heat conducting material and includes a heat input portion, a heat output portion, and a main passage portion; the heat input portion is connected to the main passage portion and extends to an area near a sparking surface; and the heat output portion is connected to the main passage portion and extends to an area near an attachment surface where the ground electrode attaches to a spark plug shell; wherein the plurality of laser deposition layers make up walls that define the internal cooling passage within the electrode base.

In accordance with the various embodiments, the ground electrode may have any one or more of the following features, either singly or in any technically feasible combination:

the heat output portion of the internal cooling passage located in the ground electrode is configured to be aligned with and thermally coupled to a heat input portion of an internal cooling passage located in the spark plug shell when the ground electrode is attached to the shell at the attachment surface;

the cooling feature is a passive cooling feature and the heat conducting material is a solid material that is bonded to the walls that define the internal cooling passage with a metallic bond;

the cooling feature is an active cooling feature and the heat conducting material is a fluid material that flows within the internal cooling passage;

the ground electrode is a bridge-type ground electrode that is configured to extend across an entire axial bore of the spark plug shell and to attach to the spark plug shell at first and second locations, the internal cooling passage includes the heat input portion, first and second heat output portions, and the main passage portion, the first heat output portion branches off of the main passage portion at a first end of the main passage portion and extends to an area near a first attachment surface where the ground electrode attaches to the spark plug shell, the second heat output portion branches off of the main passage portion at a second end of the main passage portion and extends to an area near a second attachment surface where the ground electrode attaches to the spark plug shell; and the heat input portion branches off of the main passage portion at a middle section of the main passage portion that is located between the first and second ends; and the ground electrode is an arc-type ground electrode that is configured to extend across part of an axial bore of the spark plug shell and to attach to the spark plug shell at a first location;

According to yet another embodiment, there is provided process for manufacturing a ground electrode for a spark plug, the process comprises the steps of: forming an electrode base using an additive manufacturing process, the electrode base is formed layer-by-layer such that a plurality of laser deposition layers are arranged one on top of another and define an internal cooling passage; adding a heat conducting material to the internal cooling passage; heating the heat conducting material such that it at least partially melts and fills the internal cooling passage; and allowing the at least partially melted heat conducting material to solidify and form a metallic bond with walls of the internal cooling passage, wherein the internal cooling passage and the heat conducting material are part of a cooling feature for removing heat from an area near a sparking surface.

DRAWINGS

Preferred embodiments will hereinafter be described in conjunction with the appended drawings, wherein like designations denote like elements, and wherein.

DESCRIPTION

Figure 2:
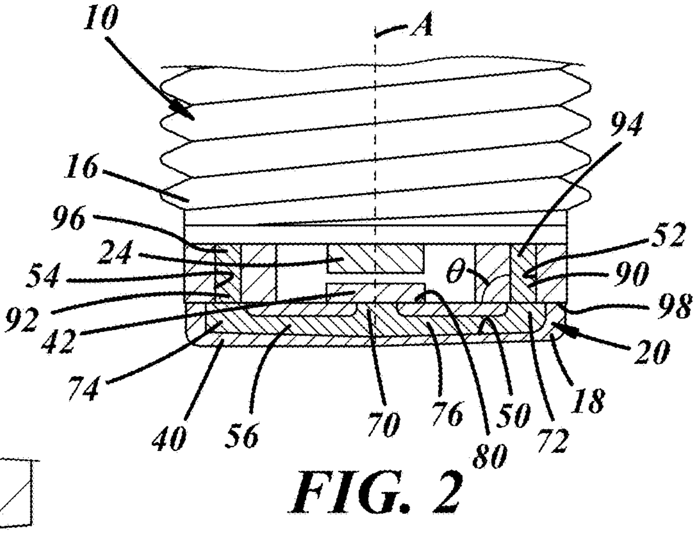
FIG. 2 is an enlarged cross-sectional view of a firing end of the spark plug in FIG. 1.

The spark plugs described herein have one or more cooling feature(s) that reduce the temperature of electrodes and can be manufactured using an additive manufacturing process. According to one example, the spark plug includes an additive manufactured ground electrode having cooling features in the form of an internal cooling passage that can be filled with either a heat conducting solid (passive cooling example) or a heat conducting fluid (active cooling example). In the passive cooling example, the internal cooling passage may be filled with a heat conducting solid, such as a copper-based material (e.g., brazing alloy, copper-molybdenum alloy), a silver-based material (e.g., silver-titanium alloy), or tin-based material (e.g., solder) that is inserted into the passage, melted and solidified such that it forms a metallic bond to the surrounding ground electrode. In the active cooling example, the internal cooling passage may be filled with a heat conducting fluid (e.g., water, glycol, liquid sodium and/or mixtures thereof) that can flow through the passage and remove heat from the ground electrode. In both the passive and active cooling examples, it is preferable for the internal cooling passage of the ground electrode to be aligned with corresponding cooling passages formed in the shell. This allows heat or thermal energy from the ground electrode to be transferred through the internal cooling passages in the ground electrode and shell and out into the engine, where it can be better dissipated.

The spark plugs disclosed herein may be used in a wide variety of applications including industrial spark plugs, automotive spark plugs, aviation igniters, glow plugs, or any other ignition device that is used to ignite an air/fuel mixture in an engine or other piece of machinery. This includes, but is certainly not limited to, the exemplary industrial spark plugs that are shown in the drawings and are described below. Other embodiments and applications are also possible, such as various types of plugs with different axial, radial and/or semi-creeping spark gaps; prechamber, non-prechamber, shielded and/or non-shielded configurations; multiple center and/or ground electrode configurations; as well as plugs that burn or ignite gasoline, diesel, natural gas, hydrogen, propane, butane, etc. The spark plug and method of the present application are in no way limited to the illustrative examples shown and described herein. Unless otherwise specified, all percentages provided herein are in terms of weight percentage (wt %) and all references to axial, radial and circumferential directions are based on the center axis A of the spark plug.

Figure 1:
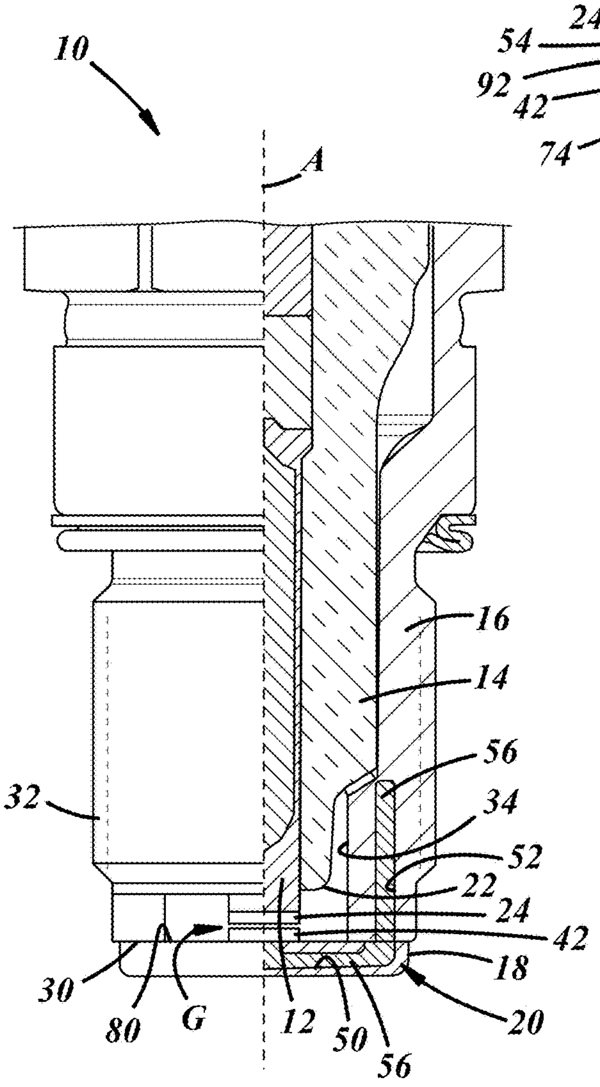
FIG. 1 is a partial cross-sectional view of a first example of a spark plug having a cooling feature, where the spark plug includes a bridge-type ground electrode and the cooling feature is a passive cooling example.
Figure 3:
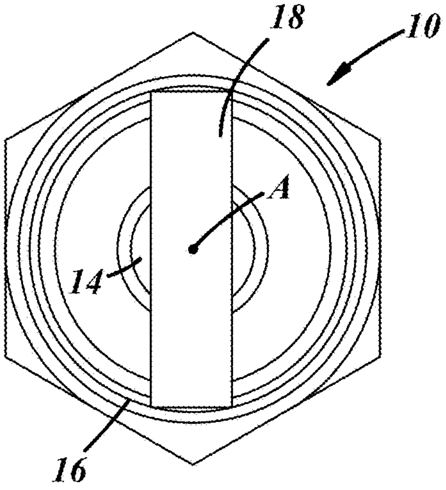
FIG. 3 is an enlarged bottom view of the spark plug in FIG. 1.

Referring to FIGS. 1-3, there is shown an example of an industrial spark plug with cooling features for improved thermal management of the plug. The spark plug 10 includes a center electrode 12, an insulator 14, a metallic shell 16, a ground electrode 18, and one or more cooling feature(s) 20.

Center electrode 12 is disposed within an axial bore of the insulator 14 and includes a firing end that protrudes beyond a free end 22 of the insulator 14 and includes an optional electrode tip 24 made from a precious metal-based material, like an iridium-, platinum-, ruthenium- palladium- and/or rhodium-based material. Insulator 14 is disposed within an axial bore of the metallic shell 16 and is constructed from a material, such as a ceramic material, that is sufficient to electrically insulate the center electrode 12 from the metallic shell 16. Shell 16 is preferably made from steel. The free end 22 of the insulator 14 may be retracted within a free end 30 of the metallic shell 16, as shown, or it may protrude beyond the metallic shell 16. The metallic shell 16 includes threads 32 so that it can be screwed into an opening in a cylinder head, an axial bore 34 extending parallel to the center axis A, as well as a number of other features well known in the art.

Ground electrode 18 may be a bridge-type electrode that extends across the entire axial bore 34 of shell 16 and is attached to the free end 30 of the shell at multiple locations (e.g., the ground electrode can be welded to the shell on both left- and right-hand sides of the plug, as illustrated). The ground electrode 18 may be in the shape of a bar, rod, plank, strip or some other configuration and includes an electrode base 40 preferably made from a nickel-based material and an electrode tip 42 made from a precious metal-based material, such as an iridium-, platinum-, ruthenium- palladium- and/or rhodium-based material. The electrode tip 42 may be in the form of a flat pad or disk that opposes a corresponding electrode tip 24 of the center electrode such that the electrode tips provide sparking surfaces for the emission, reception, and exchange of electrons across a spark gap G. The electrode tips 24, 42 may be formed from the same precious metal-based material or they may be formed from different precious metal-based materials; they may be provided in the shape of rivets, cylinders, bars, columns, wires, balls, mounds, cones, flat pads, disks, plates, rings, sleeves, etc.; they may be formed separately and then laser, electron beam and/or resistance welded to the corresponding electrode; or they may be directly formed on the corresponding electrode using an additive manufacturing process, to cite a few possibilities. In one example, ground electrode 18 is formed using an additive manufacturing process, like powder bed fusion, and includes a number of thin laser deposition layers arranged one on top of another, as will be explained.

The center electrode 12 and/or ground electrode 18 may include an electrode base made from a nickel-based material. The term "nickel-based material," as used herein, means a material in which nickel is the single largest constituent of the material by weight, and it may or may not contain other constituents (e.g., a nickel-based material can be pure nickel, nickel with some impurities, or a nickel-based alloy). According to one example, the electrode base of the center and/or ground electrode is made from a nickel-based material having a relatively high weight percentage of nickel, such as a nickel-based material comprising 98 wt % or more nickel. In a different example, the electrode base of the center and/or ground electrode is made from a nickel-based material having a lower weight percentage of nickel, like a nickel-based material comprising 50-90 wt % nickel (e.g., INCONEL™ 600, 601, 738). One particularly suitable nickel-based material has about 60-75 wt % nickel, 10-20 wt % chromium, as well as other elements in smaller quantities. Other materials, including those that are not nickel-based, such as tungsten-based materials, may be used for the electrode base instead.

Cooling feature(s) 20 are designed to reduce the operating temperature of the spark plug 10 by removing heat from the area near the spark gap G and may be part of the center electrode 12, the ground electrode 18 and/or the shell 16. According to the embodiment shown in FIGS. 1-3, cooling feature 20 is a passive cooling example and includes an internal cooling passage 50 located within ground electrode 18, internal cooling passages 52, 54 located within shell 16, and a solid heat conducting material 56 that fills the internal cooling passages and transfers heat from the arear near the spark gap to a cylinder head or other part of the engine where it can be more easily dissipated. The exact size, shape and/or location of the cooling feature 20 can vary by application.

Internal cooling passage 50 is a passageway or space within ground electrode 18 that is designed to receive heat conducting material 56. Internal cooling passage 50 extends for much of the length of ground electrode 18 and has a heat input portion 70, heat output portions 72, 74, and a main passage portion 76.

Heat input portion 70 may be positioned directly underneath electrode tip 42, which is one of the hottest parts of the spark plug, so that thermal energy generated at the spark gap G can be drawn away from the electrode tip 42 and transferred through the heat conducting material 56. In one example, heat input portion 70 extends upwards all the way to an exterior surface 80 of ground electrode 18 so that the heat conducting material 56 is exposed to and directly contacts the underside of electrode tip 42 for direct thermal coupling. According to an indirect thermal coupling example, the heat input portion 70 is similarly positioned underneath electrode tip 42 but does not extend all the way to the exterior surface 80 such that there is a thin layer of electrode base material between the heat conducting material 56 and the underside of the electrode tip 42. In both direct and indirect thermal coupling examples, the heat input portion 70 extends to an area near a sparking surface, which may be part of a separate electrode tip 42 or part of exterior surface 80 in the event that there is no separate electrode tip. At an opposite end, heat input portion 70 joins or connects to main passage portion 76.

Heat output portions 72, 74 may be positioned underneath corresponding cooling features 52, 54 in the shell 16 so that cooling features of these different components line up and are thermally coupled to one another. Much like heat input portion 70, heat output portions 72, 74 are connected to and branch off of main passage portion 76 and may or may not extend all the way to exterior surface 80 for direct or indirect thermal coupling with the corresponding cooling features in the shell. In both direct and indirect coupling examples, the heat output portions 72, 74 extend to areas near attachment surfaces, which may simply be part of exterior surface 80 or some other attachment surface.

Main passage portion 76 is the primary thermal conduit of internal cooling passage 50 and can have a larger cross-sectional area than the heat input and/or output portions 70, 72, 74, but this is not necessary. It is also possible for one or more of the heat input and/or output portions 70, 72, 74 to have a flared or enlarged opening at the exterior surface 80 for improved thermal coupling and/or alignment with the electrode tip 42 or the cooling features of the shell 16. The internal cooling passage is surrounded or encased by the electrode base 40 such that the various laser deposition layers of the electrode base define the internal cooling passage 50. Because internal cooling passage 50 is an intricate and complex interior space, it is difficult to efficiently manufacture using traditional techniques like drilling or machining, which is why it is preferably formed using an additive manufacturing process like powder bed fusion, as will be subsequently explained.

Internal cooling passages 52, 54 are located within the shell 16 and are also designed to receive heat conducting material 56. Each of the internal cooling passages 52, 54 has a heat input portion 90, 92, which is respectively aligned with a corresponding heat output portion 72, 74 of internal cooling passage 50, and has a main passage portion 94, 96.

Heat input portions 90, 92 extend to an exterior surface 98 such that the corresponding passages 52, 54 are open and exposed at the lower end of the shell 16. This allows the heat conducting material in passages 52, 54 to directly contact and mate with the heat conducting material in passage 50 for improved thermal coupling throughout the cooling feature 20. It is possible for the heat input portions 90, 92 to be the same shape and/or size as the heat output portions 72, 74, or one set of input/output portions may be oversized with respect to the other set. As best illustrated in FIG. 2, internal cooling passages 52, 54 are oriented at an angle θ with respect to internal cooling passage 50 (e.g., the passages could be perpendicular or somewhat angled to one another) and extend up into shell 16 in the vicinity or area of threads 32. In one example, internal cooling passages 52, 54 are generally perpendicular to internal cooling passage 50 (i.e., angle θ is 85-95°) and extend within shell 16 in a generally axial direction. In a different example, the internal cooling passages 52, 54 are somewhat angled to the internal cooling passage 50 (i.e., angle θ is 95°-125°) such that they diverge slightly in a radially outward manner so as to extend closer to threads 32 for enhanced thermal coupling.

Main passage portions 94, 96 may be straight or linear passages (e.g., drilled boreholes) that only extend about part way up the threads 32, however, this is not required as the passages could be curved or bent and could be longer or shorter than what is shown. It is even possible for the main passage portions 94, 96 to be spiral shaped so that they extend up through the shell 16 in a spiraling or corkscrewing fashion and are in close thermal communication with the threads 32. Much of the thermal coupling from the spark plug to the engine occurs at or near the threads 32, thus, it may be desirable for internal cooling passages 52, 54 to be as close as possible to the threads to increase the amount of heat that is transferred into the engine. If the internal cooling passages 52, 54 are straight, it may be preferable to manufacture them using traditional techniques like drilling, machining, milling and/or eroding. If, on the other hand, the internal cooling passage 52, 54 are curved, spiral and/or a complex shape, it may be desirable to manufacture the shell and the passages using an additive manufacturing process or the like.

Solid heat conducting material 56 is inserted into the different internal cooling passages 50, 52, 54 and is a thermally conductive material designed to effectively transfer heat or thermal energy within the plug. The same heat conducting material 56 may be used in each of the internal cooling passages 50, 52, 54 or a different material may be used in one passage versus another. Each of the internal cooling passages 50, 52, 54 may include a single, homogenous heat conducting material throughout the passage (i.e., a single-material core) or they may include multiple materials (i.e., a multi-material core). It is preferable that the solid heat conducting material 56 be completely filled in the internal cooling passage 50 of the ground electrode 18 such that there are no voids and the material is flush with the exterior surface 80 at the heat input and output portions 70, 72, 74. A similar flush alignment is preferable for the solid heat conducting material 56 located at the bottom of the internal cooling passages 52, 54 and the exterior surface 98. When the flushly aligned heat conducting material in passage 50 contacts the flushly aligned heat conducting material in passages 52, 54, the cooling features in the ground electrode are directly thermally coupled to the cooling features in the shell.

The solid heat conducting material 56 is made from one or more thermally conductive materials, such as copper-, silver-, tin- and/or aluminum-based materials, and has a greater thermal conductivity than that of the surrounding ground electrode 18 and/or shell 16. The solid heat conducting material may have a thermal conductivity greater than 70 W/m·K (measured at 100° C.) and, even more preferably, a thermal conductivity greater than 140 W/m·K (measured at 100° C.). It is preferable for the solid heat conducting material to have a melting temperature greater than 900° C. so that the material can survive different steps of the spark plug manufacturing process, where temperatures can exceed 750° C., without experiencing a change to its aggregate state. The term "copper-based material," as used herein, means a material in which copper is the single largest constituent of the material by weight, and it may or may not contain other constituents (e.g., a copper-based material can be pure copper, copper with some impurities, or a copper-based alloy). According to one example, the solid heat conducting material 56 is a copper-based material, such as a copper-molybdenum alloy or a brazing alloy (e.g., brass); a silver-based material, such as a silver-titanium alloy; or a tin-based material like solder. However, other materials may be used as well.

Figure 4:
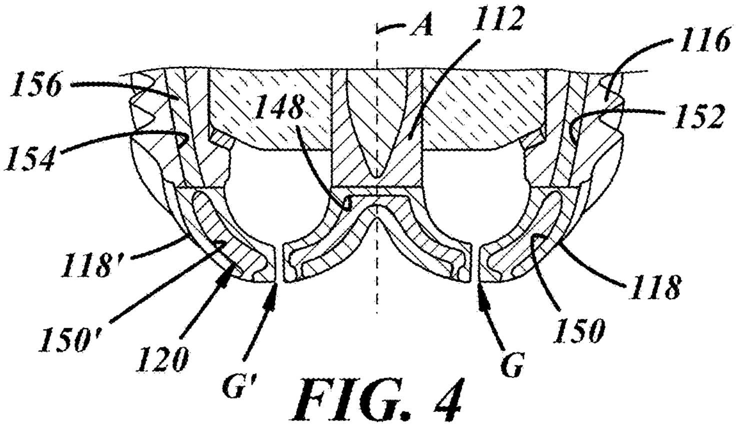
FIG. 4 is a partial cross-sectional view of a second example of a spark plug having a cooling feature, where the spark plug includes an arc-type ground electrode and the cooling feature is a passive cooling example.

In FIG. 4, where similar reference numerals to FIGS. 1-3 denote similar features, there is shown another passive cooling example, only in this example the cooling features 120 are a part of a center electrode 112, several ground electrodes 118, 118', and optionally a shell 116. Each of the center and ground electrodes 112, 118, 118' has an arch-type configuration and is designed to oppose a corresponding electrode across a spark gap G, G'. Cooling features 120 may include internal cooling passages 148 located in the center electrode 112, internal cooling passages 150, 150' located in ground electrodes 118, 118', and optional internal cooling passages 152, 154 located in the shell 116. Each of the internal cooling passages, in turn, may include one or more heat input portion(s), heat output portion(s) and/or main passage portion(s), as described above. The internal cooling passages 150, 150' of the ground electrodes 118, 118' may be directly thermally coupled to the internal cooling passages 152, 154 of the shell 116 (i.e., the solid heat conducting material 156 in one passage directly contacts the solid heat conducting material in an opposing passage), or the internal cooling passages 150, 150' and their corresponding heat conducting material may be indirectly thermally coupled to the internal cooling passages of the shell (as shown). In a different embodiment, the internal cooling passages 152, 154 of the shell are omitted so that the cooling features of the ground electrodes 118, 118' are thermally coupled to the shell itself.

Figure 6:
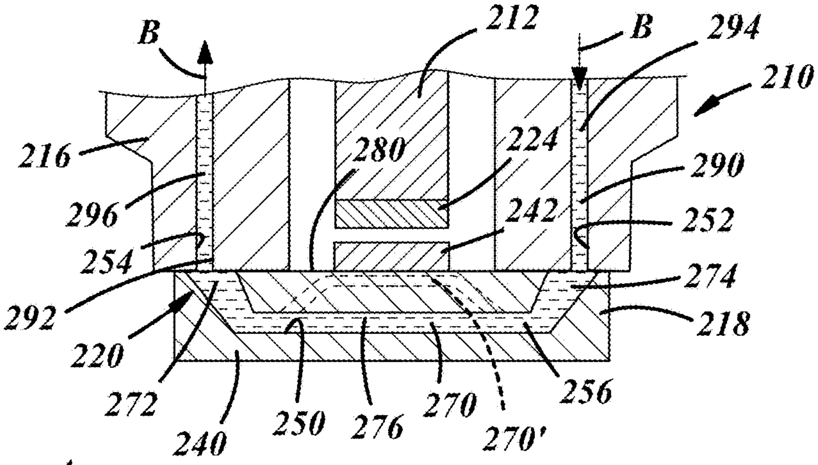
FIG. 6 is an enlarged cross-sectional view of a firing end of the spark plug in FIG. 5.
Figure 5:
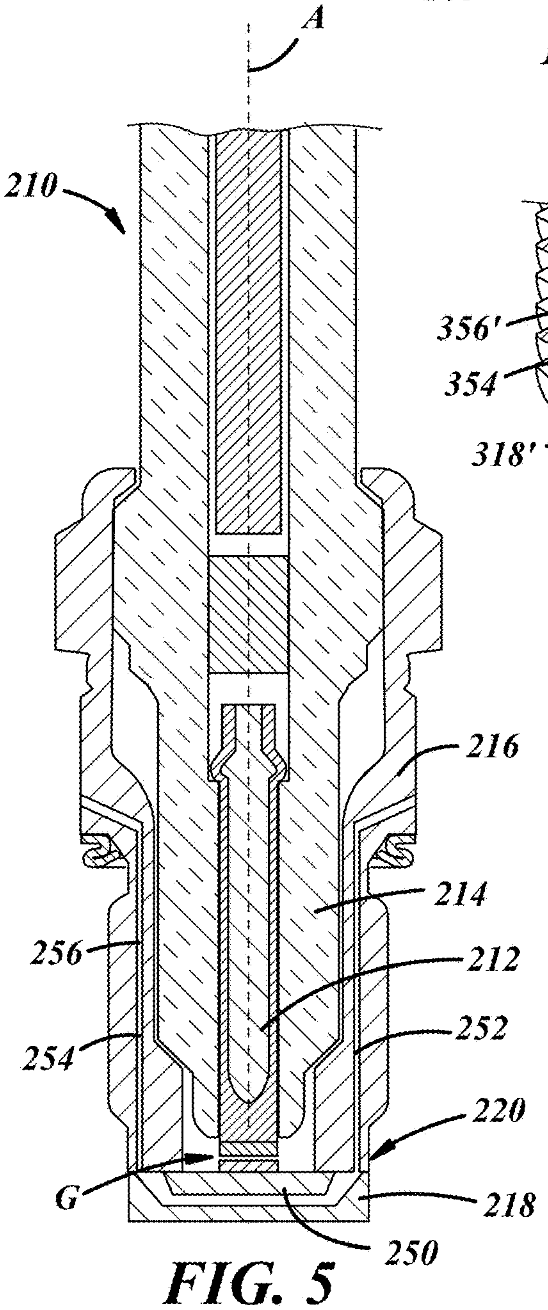
FIG. 5 is a partial cross-sectional view of a third example of a spark plug having a cooling feature, where the spark plug includes a bridge-type ground electrode and the cooling feature is an active cooling example.

The preceding embodiments have all been passive cooling examples where the heat conducting material is a solid material. Turning now to FIGS. 5-8, active cooling examples are shown where the heat conducting material is a fluid that circulates within internal cooling passages and, thus, transfers heat from the area around the spark gap to portions of the engine which are cooler. In FIGS. 5 and 6, a spark plug 210 includes a center electrode 212, an insulator 214, a metallic shell 216, a ground electrode 218, and one or more cooling feature(s) 220. Unless stated otherwise, reference numerals in the following embodiments that are similar to those in preceding embodiments denote similar features, and the various configurations and/or features of the preceding passive cooling examples may apply to the following active cooling examples as well. Duplicate descriptions have been omitted.

Cooling feature(s) 220 are designed to reduce the operating temperature of the spark plug 210 by removing heat from the area near the spark gap G and may be part of the shell 216 and the ground electrode 218. In this active cooling example, the cooling features 220 include an internal cooling passage 250 that passes through ground electrode 218, internal cooling passages 252, 254 that extend within shell 216, and a fluid heat conducting material 256 that flows through the internal cooling passages and carries heat away from the area near the spark gap to a cylinder head or other part of the engine where it can be dissipated. The cooling features 220 may also include other items, such as fluid pumps, heat exchange devices and return passages in the cylinder head and/or engine (not shown), to facilitate the circulation of the fluidic heat conducting material 256. The exact type, size, shape and/or location of the cooling feature 220 can vary by application, as well as by the particular fluid heat conducting material that is used.

Internal cooling passage 250 is a passageway or conduit within ground electrode 218 and is designed so that the fluid heat conducting material 256 can flow therethrough. In one example, the internal cooling passage 250 extends for most of the length of ground electrode 18, which is generally in a radial direction with respect to longitudinal axis A, and has a heat input portion 270, a heat output portion 272, a fluid return portion 274, and a main passage portion 276. Because internal cooling passage 250 conveys a fluid heat conducting material 256, the passage may be designed for improved fluid dynamics (e.g., to reduce fluid friction, etc.).

If ground electrode 218 has a precious metal-based electrode tip 242, then heat input portion 270 may be positioned directly underneath the tip and in close enough proximity so that thermal energy generated at the spark gap G can be drawn away and transferred through the circulating heat conducting material 256. If ground electrode 218 does not include a separate electrode tip 242, then heat input portion 270 can simply pass underneath the portion of exterior surface 280 that forms a spark gap G with an opposing electrode tip 224 of the center electrode 212. In FIG. 6, the heat input portion 270 is simply shown as a straight channel section that extends to an area near a sparking surface. Alternatively, it is possible for a heat input portion 270' (broken lines) to branch off and diverge away from the straight channel section so that it passes more closely by the sparking surface and increases the thermal coupling therebetween. The exact configuration of the heat input portion, as well as its spacing or distance from the sparking surface, can vary depending on the particular application. If ground electrode 218 includes a separate electrode tip 242, it is even possible for heat input portion 270 to extend upwards all the way to exterior surface 280 so that the heat conducting material 256 is exposed to and directly contacts the underside of the electrode tip for direct thermal coupling. In this example, the underside of electrode tip 242 helps enclose the internal cooling passage 250.

Heat output portion 272 is positioned underneath a corresponding cooling feature in the shell 216 so that the internal cooling passages 250, 254 of the ground electrode and shell can line up and be in fluid communication with one another. Heat output portion 272 is connected to and branches off of main passage portion 276 and extends all the way to exterior surface 280 so that it opens into the opposing internal cooling passage 254. Although not necessary, it is preferable for one or more of the heat output and/or fluid return portions 272, 274 to have a flared or enlarged opening at the exterior surface 280 for improved thermal coupling with the cooling features of the shell 16. As illustrated in FIG. 6, the flared openings of the heat output portion 272 and of the fluid return portion 274 are preferably wider than the corresponding portions of internal cooling passages 254 and 254, respectively. In addition to potentially improving the flow of the fluid heat conducting material 256 between channels, the flared and oversized configuration of the openings at 272, 274 helps ensure positional accuracy and alignment of the passages. If, for example, there is a small misalignment when the ground electrode 218 is attached to the shell 216, the flared and oversized openings at 272, 274 could still allow sufficient fluid coupling at the interface of the channels. According to a different possibility, fluid return portion 274 in ground electrode 218 and heat input portion 292 could be flared or enlarged, while fluid output portion 290 in the shell and heat output portion 272 in the ground electrode remain a smaller size. This arrangement would still enjoy the improved alignment and fluid coupling advantages mentioned above, but would also potentially enjoy improved fluid dynamics by having inter-component interfaces where a smaller opening feeds into a larger one, thus, reducing fluid bottle necks. The internal cooling passage 250 is surrounded or encased by the electrode base 240, which is preferably formed using an additive manufacturing process and includes a number of thin laser deposition layers that define the internal cooling passage.

Main passage portion 276 is the primary thermal conduit of internal cooling passage 250 and can have any number of different configurations, including straight, bent, curved and/or other simple or complex configurations. Because ground electrode 218, which includes laser deposition layers defining internal cooling passage 250, is formed using an additive manufacturing process, there is a substantial amount of design freedom available in terms of the configuration of the passage, including complex configurations and designs that would otherwise be unavailable for such an interior space. For instance, it is possible for main passage portion 276 to include an enlarged pocket or bulging balloon section in the vicinity of heat input portion 270 to help collect additional thermal energy from the area near the sparking surface. Other configurations and features are possible as well.

Internal cooling passages 252, 254 are located within the shell 216 and are also designed to convey fluid heat conducting material 256. Internal cooling passage 252 has a main passage portion 294 connected to a fluid output portion 290 that, in turn, is fluidly coupled to fluid return portion 274 so that the heat conducting material 256 can return back to ground electrode 218 in direction B once thermal energy has been removed from the fluid 256. A heat exchange device, like a cooling fin or a cooler of some type, could be located on the outside of the spark plug or in the cylinder head and could be used to extract thermal energy from the fluid 256 so that it is cooled before returning to the ground electrode 218. Internal cooling passage 254 includes a heat input portion 292 that is aligned and fluidly coupled with heat output portion 272. Once the heated fluid 256 gathers thermal energy from the area near the spark gap and exits the ground electrode 218, it enters the heat input portion 292 and travels through the main passage portion 296 on its way to the engine. A reverse process takes place when the cooled fluid returns through main passage portion 294 and fluid output portion 290 before returning to the ground electrode 218. Internal cooling passages 252 and 254 include fluid ports at opposite ends of the passages as portions 290 and 292 so that the passages can be fluidly coupled to corresponding passages in the cylinder head.

Main passage portions 294, 296 may be straight or linear passages (e.g., drilled boreholes) that extend past the threads 32. However, this is not required as the passages could be curved or bent and could exit the spark plug at other locations as well.

Figure 7:
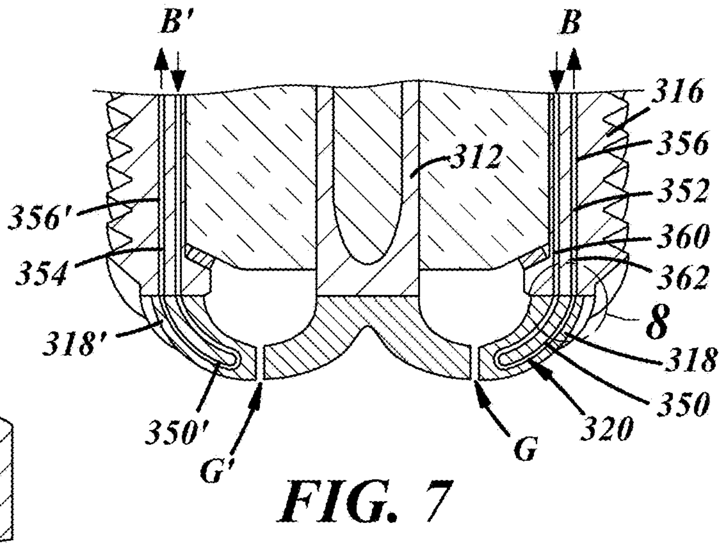
FIG. 7 is a partial cross-sectional view of a fourth example of a spark plug having a cooling feature, where the spark plug includes an arc-type ground electrode and the cooling feature is an active cooling example.
Figure 8:
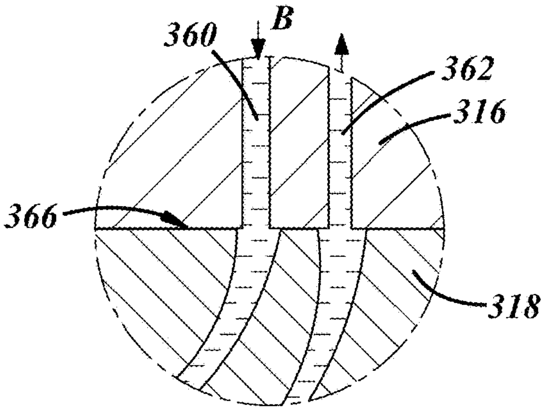
FIG. 8 is an enlarged cross-sectional view of an inter-component interface of the spark plug in FIG. 7.

With reference to FIGS. 7 and 8, there is shown another embodiment of an active cooling example that uses circulating fluid to cool a spark plug electrode, and where similar reference numerals to denote similar features. Each of the center and ground electrodes 312, 318, 318' has an arch-type configuration and is designed to oppose a corresponding electrode across a spark gap G, G'. Cooling features 320 may internal cooling passages 350, 350' located in ground electrodes 318, 318', internal cooling passages 352, 354 located in the shell 316, and a liquid or fluid heat conducting material 356, 356' that respectively flows therethrough. Each of the internal cooling passages, in turn, may include one or more heat input portion(s), heat output portion(s) and/or main passage portion(s), as described above. One difference between this embodiment and the previous active cooling embodiment shown in FIGS. 5-6 is that internal cooling passages 350 and 352 can form a first closed fluid loop, and internal passages 350' and 354 can form a second closed fluid loop that is separate and fluidly isolated from the first closed fluid loop. In such an embodiment, internal cooling passage 350 includes an input section 360 that delivers cooler fluid to the spark gap area and an output section 362 that takes hotter fluid away from the spark gap area in a circulating direction B. The internal cooling passage 354 may include similar input and output sections for circulating fluid in a direction B'. In this embodiment, there are no fluid circulating passages in the center electrode 312. FIG. 8 shows an enlarged view of an example of the inter-component interface 366 between shell 316 and ground electrode 318 where the openings of input and output sections 360, 362 are flared or enlarged to promote improved thermal coupling and alignment between the cooling features. As an alternative, it is possible for the opening on the shell-side of section 362 to be enlarged, compared to the ground electrode side for enhanced fluid dynamics. It should also be noted that the fluid circulating direction B in the various active cooling examples could be reversed.

Figure 9:
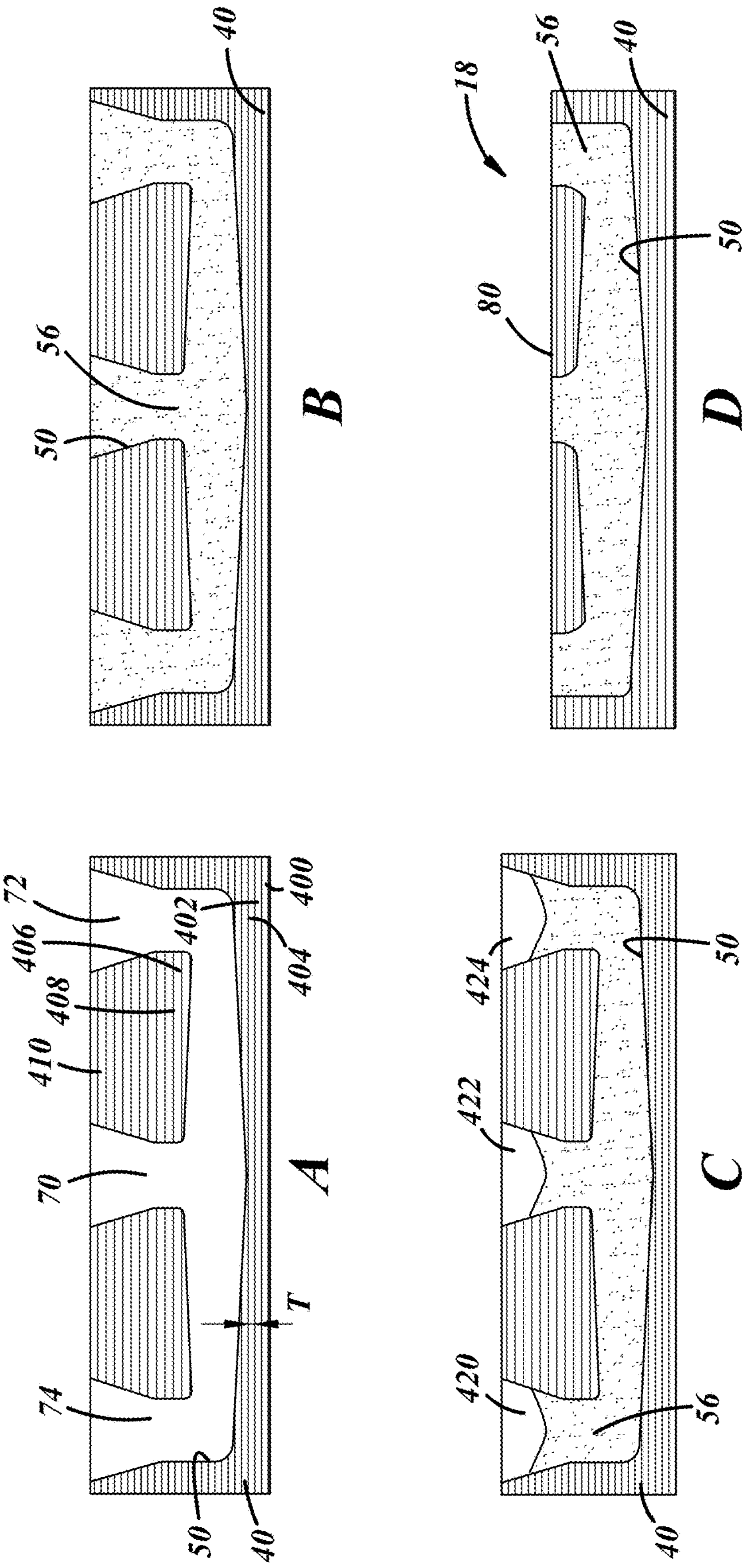
FIGS. 9A-9D show several cross-sectional views of a ground electrode being manufactured according to an additive manufacturing process.

Turning now to FIG. 9, there are shown several stages of an exemplary process for manufacturing a ground electrode with one more cooling feature(s), such as the previously described ground electrode 18. Starting with FIG. 9A, the ground electrode 18 may be formed in a layer-by-layer manner using an additive manufacturing process, such as a powder bed fusion technique. Some non-limiting examples of potential powder bed fusion techniques that may be used include: selective laser melting (SLM), selective laser sintering (SLS), direct metal laser sintering (DMLS), electron beam melting (EBM) and/or any other suitable 3D printing technique. The ground electrode 18 can be made from a bed of nickel-based powder that is irradiated by a laser or electron beam so that the powder melts and solidifies into thin laser deposition layers 400-410. This process begins with an initial laser deposition layer 400 and is then repeated, thereby creating a number of laser deposition layers 400-410 that are sequentially built or stacked on top of one another such that the layers are parallel to one another (being "parallel" in this context does not require perfect parallelism). Each laser deposition layer 400-410 has an average layer thickness T, which may be between 5 μm and 60 μm, for example. It should be appreciated that while the drawings only show several dozen laser depositions layers, an actual additively manufactured ground electrode could have many dozens or even hundreds of separate laser deposition layers that may or may not be visible once the ground electrode is manufactured. A ground electrode that is manufactured using an additive manufacturing process, as described herein, is still considered to have a plurality of laser deposition layers, even if such layers cannot be individually seen or observed, as such layers will sometimes meld or blend into one another. This blending can make it difficult to observe separate or discrete layers, even under magnification, but does not change the fact that the ground electrode is comprised of a plurality of laser deposition layers stacked one on top of another.

One reason why additive manufacturing is suitable for forming ground electrode 18 is the intricate shape of internal cooling passage 50 or heat conducting volume, which would be difficult if not impossible to cost effectively manufacture otherwise. For instance, the shape of the internal cooling passage 50, with its heat input portion 70, heat output portions 72, 74, and its main passage portion 76, would likely prohibit it from being manufactured using traditional drilling, boring and milling techniques. During the additive manufacturing process, the laser or electron beam follows a predefined pattern for each laser deposition layer so that it only melts powder in those areas where a new laser deposition layer is to be formed, but does not melt powder in those areas that correspond to the internal cooling passage 50. The predefined pattern may change slightly for each successive layer so that an intricate and irregular cross-sectional shape for the internal cooling passage 50 can be created. In this way, the various laser deposition layers make up the walls that define the internal cooling passage 50 within the electrode base 40, as they are built up layer-by-layer around the passage. In addition, the additive manufacturing process is able to produce an internal geometry that helps facilitate the degassing of the solid heat conducting material. When the solid heat conducting material (e.g., solder) is introduced to the internal cooling passage 50 by melting, for example, the internal geometry of the passage with angles from 3-180 promote a freedom of movement of bubbles or defects such that the material is quickly and successfully degassed.

Once the ground electrode 18 with its stacked laser deposition layers 400-410 defining internal cooling passage 50 is formed, the heat conducting material 56 is added, as illustrated in FIG. 9B. In this passive cooling example, the heat conducting material 56 of the finished spark plug is a solid material, such as a copper-based material, a silver-based material or a tin-based material. In order to properly fill the internal cooling passage 50 with the heat conducting material 56, the material must be in a powder, paste and/or other type of state so that it can adequately fill the various input and output portions, as well as any other crevices, corners or spaces in the passage. In one example, the heat conducting material 56 is a copper-based material and is initially in a paste-like state when it is inserted into internal cooling passage 50. It is preferable that the heat conducting material 56 be filled to the top or near the top of the internal cooling passage 50, as shown in FIG. 9B.

After internal cooling passage 50 is adequately filled with heat conducting material 56, the combined part is heated so that material 56 at least partially melts and settles within passage 50. Induction heating may be used for this step, but other heating techniques are certainly possible. Skilled artisans will appreciate that, due to solidification shrinkage, the top of the heat conducting material 56 retracts or retreats somewhat down into the passage, thereby forming several recesses 420-424. Accordingly, the top of the heat conducting material 56 is not flush with the top of the electrode base 40, as illustrated in FIG. 9C. Once solidified, the heat conducting material 56 may form a metallic bond with the surrounding walls of the internal cooling passage 50.

The manufacturing process may then use a grinding, milling and/or other machining process to remove electrode base material so that an exterior surface 80 is formed at the top of the part where the electrode base 40 and heat conducting material 56 are flush with one another, see FIG. 9D. The flush exterior surface 80 may improve direct thermal coupling between cooling features of the ground electrode 18 and of the shell 16 once the ground electrode is attached and in place.

In terms of forming the cooling features of the shell 16, there are several different potential techniques that may be employed. For those embodiments where the shell 16 has internal cooling passage that are comprised of straight or linear sections, such as passages 52, 54, 252, 254, 352, 354, the passages may be formed by conventional techniques like drilling, boring, eroding and/or other machining techniques. For instance, passages 252, 254 in FIG. 5 could be formed by drilling a first linear passage segment from the bottom of the shell 16 and then drilling a second linear passage segment from the side of the shell such that they meet and connect with one another. For those embodiments where the shell 16 has internal cooling passages having curved, spiral, complex and/or other non-linear sections, then the entire shell or just the portion of the shell where such sections are included could be formed with an additive manufacturing process, like those explained above. An example of such an embodiment is when the internal cooling passage of the shell follows a spiral and/or corkscrewing path (not shown) that brings it into close thermal communication with the threads 32. Other examples exist as well. The heat conducting material could then be added to the internal cooling passage, heated, solidified and machined down to a flush exterior surface 98, as described above.

With the cooling feature(s) of both the ground electrode and shell now being formed, the ground electrode may be attached to the shell so that the cooling feature(s) align with and are thermally coupled to one another. In one example, the flush exterior surface 80 of ground electrode 18 is pressed against a flush exterior surface 98 of shell 16 so that the heat conducting material 56 in both components is directly thermally coupled together. It is possible for the heat conducting material 56 in the ground electrode and the shell to be the same material or they may be different materials, depending on the application. Once properly aligned—a process that may be aided or made simpler by the flared or enlarged openings in the passages, as explained above—the ground electrode 18 can be laser or resistance welded to the bottom of the shell 16.

The above-described manufacturing process is directed to passive cooling examples. For active cooling examples, a similar process could be used to additively manufacture a ground electrode 218, 318 with intricate internal cooling passages 250, 350, 350'. But instead of inserting, melting and solidifying the heat conducting material, the active cooling embodiment may simply add the heat conducting material 256, 356, 356', which is in fluid or liquid form, to the passages. Cast risers that function as small funnels may be added to the openings of the internal cooling passages when the electrode base is formed in the previous step so as to facilitate better filling of the fluid heat conducting material, but this is merely optional. After the preceding steps are complete, the ground electrode 218, 318 may be attached to the shell 216, 316, as previously described.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A spark plug, comprising:

a shell having an axial bore;

an insulator at least partially disposed within the axial bore of the shell and having an axial bore;

a center electrode at least partially disposed within the axial bore of the insulator;

a ground electrode attached to the shell and having an electrode base; and a cooling feature having a first internal cooling passage formed within the electrode base of the ground electrode, a first heat conducting material situated within the first internal cooling passage, a second internal cooling passage formed within the shell, and a second heat conducting material situated within the second internal cooling passage, wherein the first internal cooling passage is aligned with the second internal cooling passage and the first heat conducting material is thermally coupled to the second heat conducting material so that, during operation, the cooling feature can remove heat from an area near a sparking surface.

2. The spark plug of claim 1, wherein the electrode base of the ground electrode includes a plurality of laser deposition layers that are arranged one on top of another and define the first internal cooling passage.

3. The spark plug of claim 2, wherein the plurality of laser deposition layers of the electrode base are made from a nickel-based material using a powder bed fusion technique.

4. The spark plug of claim 1, wherein the ground electrode includes an electrode tip made from a precious metal-based material, the electrode tip includes the sparking surface and is attached to the electrode base such that the first heat conducting material is directly thermally coupled to the electrode tip at a heat input portion.

5. The spark plug of claim 1, wherein the cooling feature is a passive cooling feature, the first heat conducting material is a solid material that is bonded to the first internal cooling passage with a first metallic bond, and the second heat conducting material is a solid material that is bonded to the second internal cooling passage with a second metallic bond.

6. The spark plug of claim 5, wherein each of the first and second heat conducting materials is made from at least one of a copper-based material, a silver-based material or a tin-based material.

7. The spark plug of claim 6, wherein the first and second heat conducting materials are the same material.

8. The spark plug of claim 6, wherein the first and second heat conducting materials are different materials.

9. The spark plug of claim 1, wherein the cooling feature is an active cooling feature, and the first and second heat conducting materials are a fluid material that flows within the first and second internal cooling passages.

10. The spark plug of claim 1, wherein the first and second heat conducting materials are the same material and include at least one of water, glycol, sodium or a mixture thereof.

11. The spark plug of claim 1, wherein the first internal cooling passage includes a heat output portion with a flared or enlarged opening for improved alignment with the second internal cooling passage.

12. The spark plug of claim 1, wherein the ground electrode is a bridge-type ground electrode that extends across the entire axial bore of the shell and attaches to the shell at first and second locations, the first internal cooling passage includes a heat input portion, first and second heat output portions, and a main passage portion;

the first heat output portion branches off of the main passage portion at a first end of the main passage portion and extends to an area near a first attachment surface where the ground electrode attaches to the shell;

the second heat output portion branches off of the main passage portion at a second end of the main passage portion and extends to an area near a second attachment surface where the ground electrode attaches to the shell; and the heat input portion branches off of the main passage portion at a middle section of the main passage portion that is located between the first and second ends.

13. The spark plug of claim 1, wherein the ground electrode is an arc-type ground electrode that extends across part of the axial bore of the shell and attaches to the shell at a first location.

14. A ground electrode for a spark plug, comprising:

an electrode base having a plurality of laser deposition layers arranged one on top of another; and a cooling feature having an internal cooling passage and a heat conducting material, the internal cooling passage is filled with the heat conducting material and includes a heat input portion, a heat output portion, and a main passage portion;

the heat input portion is connected to the main passage portion and extends to an area near a sparking surface; and the heat output portion is connected to the main passage portion and extends to an area near an attachment surface where the ground electrode attaches to a spark plug shell;

wherein the plurality of laser deposition layers make up walls that define the internal cooling passage within the electrode base.

15. The ground electrode of claim 14, wherein the heat output portion of the internal cooling passage located in the ground electrode is configured to be aligned with and thermally coupled to a heat input portion of an internal cooling passage located in the spark plug shell when the ground electrode is attached to the shell at the attachment surface.

16. The ground electrode of claim 14, wherein the cooling feature is a passive cooling feature and the heat conducting material is a solid material that is bonded to the walls that define the internal cooling passage with a metallic bond.

17. The ground electrode of claim 14, wherein the cooling feature is an active cooling feature and the heat conducting material is a fluid material that flows within the internal cooling passage.

18. The ground electrode of claim 14, wherein the ground electrode is a bridge-type ground electrode that is configured to extend across an entire axial bore of the spark plug shell and to attach to the spark plug shell at first and second locations, the internal cooling passage includes the heat input portion, first and second heat output portions, and the main passage portion;

the first heat output portion branches off of the main passage portion at a first end of the main passage portion and extends to an area near a first attachment surface where the ground electrode attaches to the spark plug shell;

the second heat output portion branches off of the main passage portion at a second end of the main passage portion and extends to an area near a second attachment surface where the ground electrode attaches to the spark plug shell; and the heat input portion branches off of the main passage portion at a middle section of the main passage portion that is located between the first and second ends.

19. The ground electrode of claim 14, wherein the ground electrode is an arc-type ground electrode that is configured to extend across part of an axial bore of the spark plug shell and to attach to the spark plug shell at a first location.

20. A process for manufacturing a ground electrode for a spark plug, the process comprises the steps of:

forming an electrode base using an additive manufacturing process, the electrode base is formed layer-by-layer such that a plurality of laser deposition layers are arranged one on top of another and define an internal cooling passage;

adding a heat conducting material to the internal cooling passage;

heating the heat conducting material such that it at least partially melts and fills the internal cooling passage; and allowing the at least partially melted heat conducting material to solidify and form a metallic bond with walls of the internal cooling passage, wherein the internal cooling passage and the heat conducting material are part of a cooling feature for removing heat from an area near a sparking surface.

* * * * *